United States Patent [19]

Schmitt

[11] Patent Number: 4,774,587
[45] Date of Patent: Sep. 27, 1988

[54] STILL VIDEO TRANSCEIVER PROCESSOR

[75] Inventor: Bonnie J. Schmitt, Spencerport, N.Y.

[73] Assignee: Eastman Kodak Company, Rochester, N.Y.

[21] Appl. No.: 57,595

[22] Filed: Jun. 2, 1987

[51] Int. Cl.[4] .......................................... H04N 7/133
[52] U.S. Cl. ..................................... 358/260; 358/85; 358/133; 358/280
[58] Field of Search ................. 358/85, 133, 134, 260, 358/280

[56] References Cited

U.S. PATENT DOCUMENTS

| | | | |
|---|---|---|---|
| 3,883,847 | 5/1975 | Frank | 364/900 |
| 4,044,347 | 8/1977 | Van Voorhis | 340/347 DD |
| 4,091,424 | 5/1978 | Widergren | 358/260 |
| 4,288,782 | 9/1981 | Bader et al. | 382/34 |
| 4,302,775 | 11/1981 | Widergren et al. | 358/136 |
| 4,385,363 | 5/1983 | Widergren et al. | 364/725 |
| 4,394,774 | 7/1983 | Widergren et al. | 382/56 |
| 4,410,916 | 10/1983 | Pratt et al. | 358/263 |
| 4,541,012 | 9/1985 | Tescher | 358/133 |
| 4,549,212 | 10/1985 | Bayer | 38/167 |
| 4,633,441 | 12/1986 | Ishimoto | 365/189 |
| 4,660,177 | 4/1987 | O'Conner | 365/189 |
| 4,689,741 | 8/1987 | Redwine | 364/200 |
| 4,704,628 | 11/1987 | Chen | 358/133 |

OTHER PUBLICATIONS

"Multidimensional Rotations in Feature Selection", by Harry C. Andrews, IEEE Transaction on Computers, Sep. 1971, pp. 1045-1051.
"Discrete Cosine Transform", by N. Admed et al, IEEE Transactions on Computers, Jan. 1974, pp. 90-93.
"A Fast Computational Algorithm for Discrete Cosine Transform", by Wen-Hsiung Chen et al, IEEE Transactions on Communications, vol. Com-25, No. 9, Sep. 1977, pp. 1004-1009.

Primary Examiner—Howard W. Britton
Attorney, Agent, or Firm—Robert M. Wallace

[57] ABSTRACT

A still video transceiver processor, which transmits or receives serial data segments of a compressed video frame, includes a segment information array which tracks the current state (sent/not sent) and status (acknowledged/unacknowledged) of each compressed segment and the address of the corresponding uncompressed image blocks in the video frame. The segment information array enables the transceiver processor to deduce whenever a transmitted segment must be retransmitted over one of two channels in response to a negative acknowledgement received over the other channel, and assures proper placement of the uncompressed (expanded) image blocks in the video frame of the receiver unaffected by out-of-order retransmission of any data segments.

9 Claims, 5 Drawing Sheets

TRANSMIT MODE

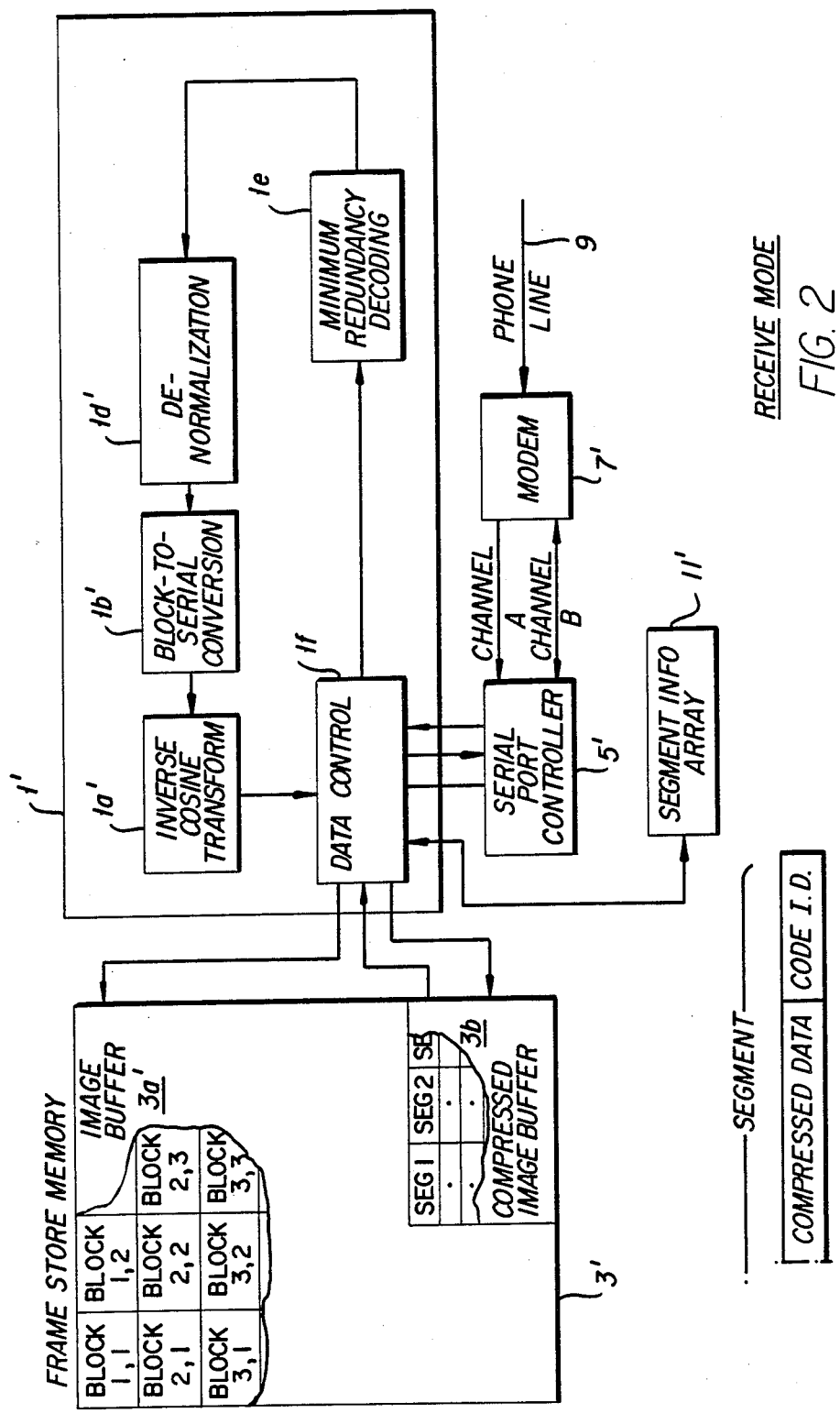

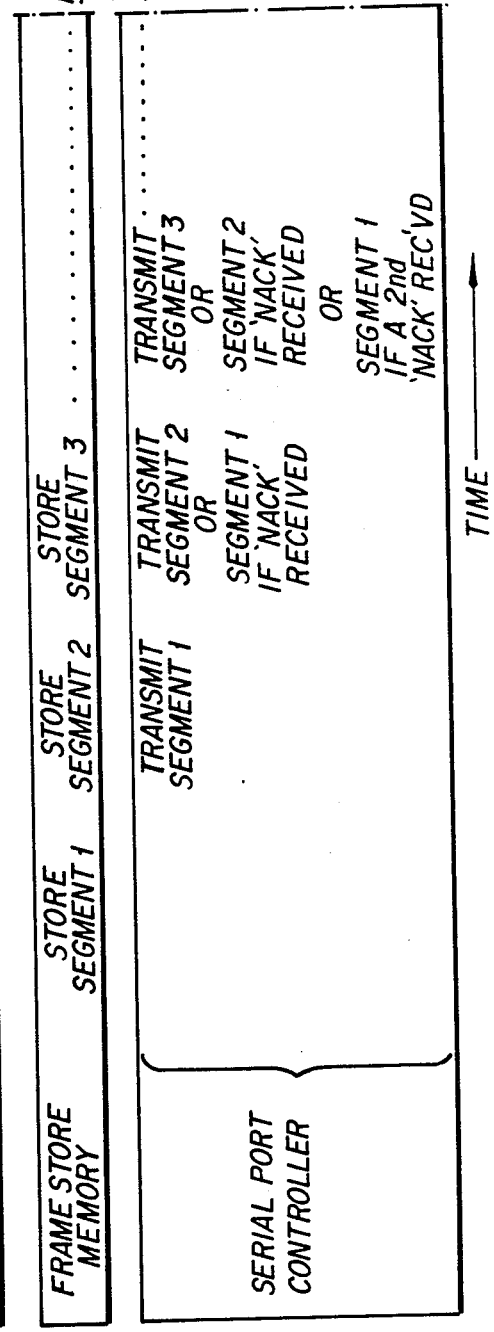

RECEPTION

RECEIVE CODE I.D. OF INCOMING SEGMENT
ENTER CODE I.D. INTO SEGMENT INFO ARRAY (OF THE RECEIVER) INCLUDING:
- CORRESPONDING IMAGE BUFFER START ADDRESS
- TRANSMISSION RATE
- TRANSMISSION MODE

SET THE COMPRESSED IMAGE BUFFER START ADDRESS TO THE NEXT AVAILABLE LOCATION IN THE RECEIVER'S COMPRESSED IMAGE BUFFER
ENTER INTO THE RECEIVER'S SEGMENT INFO ARRAY:
- COMPRESSED IMAGE BUFFER START ADDRESS
- STATE OF SEGMENT = "NOT FULL"
- STATUS OF SEGMENT = "NACK"

RECEIVE THE INCOMING SEGMENT & STORE IT BEGINNING AT THE COMPRESSED IMAGE BUFFER START ADDRESS WHEN AN END-OF-SEGMENT INTERRUPT IS RECEIVED:
- CHANGE THE STATE TO "FULL"
- CHECK THE PARITY BIT(S) (CYCLIC REDUNDANCY CHECK BITS-CRC BITS)
- IF AN ERROR IS DETECTED BY THE PARITY BIT CHECK THEN:
  - CHANGE STATUS TO "NACK" (NEG. ACKNOWLEDGE) & SEND "NACK" TO TRANSMITTER
  - RETURN ADDRESS PRINTER TO COMPRESSED IMAGE BUFFER START ADDRESS

OTHERWISE:
- CHANGE STATUS TO "ACK" (POSITIVE ACKNOWLEDGE) & SEND "ACK" TO TRANSMITTER
- COUNT THE NUMBER OF BYTES IN THE SEGMENT
- ENTER THE NUMBER OF BYTES INTO THE SEGMENT INFO ARRAY

EXPANSION

FETCH FROM THE COMPRESSED IMAGE BUFFER THE EARLIEST OF THOSE SEGMENTS WHICH INDICATE 'FULL' & 'ACK'. GENERATE A SERIES OF EXPANDED BLOCKS FROM THE FETCHED SEGMENT BY PERFORMING:
- RUN LENGTH DECODING, INVERSE NORMALIZATION, INVERSE ZIG ZAG TRANSFORM & INVERSE COSINE TRANSFORM

STORE THE SERIES OF EXPANDED BLOCKS IN THE IMAGE BUFFER BEGINNING AT THE IMAGE BUFFER START ADDRESS

FIG. 6

STILL VIDEO TRANSCEIVER PROCESSOR

RELATED APPLICATIONS

The subject matter of this application is related to subject matter contained in U.S. patent application Ser. No. 057,066 filed June 2, 1987 by Kathleen Ann Laspada entitled "Still Video Frame Store Memory"; U.S. patent application Ser. No. 057,410 filed June 2, 1987 by C. T. Chen, M. Rabbani and S. J. Daly entitled "Image Transmission System with Preview Mode"; U.S. patent application Ser. No. 057,413 filed June 2, 1987 by S. J. Daly, M. Rabbani and C. T. Chen entitled "Digital Image Compression and Transmission System Employing Visually Weighted Transform Coefficients"; U.S. patent application Ser. No. 057,414 filed June 2, 1987 by S. J. Daly, C. T. Chen and M. Rabbani entitled "Adaptive Block Transform Image Coding Method and apparatus"; U.S. patent application Ser. No. 057,585 filed June 2, 1987 by Vincent T. Roche, Rocco John Porcellio and Keith Aaron Hadley entitled "Dual Block Still Video Compander Processor"; and U.S. patent application Ser. No. 057,596 filed June 2, 1987 by Mojgan Rabbani and Rocco John porcellio entitled "Image Transmission System with Line Averaging preview Mode Using Two-Pass Block-Edge Interpolation".

BACKGROUND OF THE INVENTION

In a system which communicates a high quality still video image over a narrow bandwidth communication channel, such as a dial-up telephone line, it is desirable to first capture the still video image as digital data and store it in a frame store memory and then compress the data prior to transmission, in order to transmit the image within a reasonable amount of time. The invention is directed to video communication systems capable of transmitting for example) 512 horizontal lines of full quality color NTSC-compatible video data within about one minute over a standard dial-up telephone line. The goal of reducing the transmission time for each video frame to just one minute requires a solution to a seemingly intractable technical problem. It is solved in the manner described in copending patent application serial number (unknown) filed (herewith) by Vincent Roche and Rocco Porcellio and entitled Dual Block Still Video Compander Transceiver.

Compander Processor

In accordance with the referenced patent application, the technical problem is tackled by first dividing the high quality image stored in the frame store memory into a plurality of small adjoining blocks in the image plane. The image is compressed by compressing each of the blocks individually, one-by-one, prior to transmission. At the receiving end, the compressed data is expanded to reconstruct the array of adjoining blocks comprising the transmitted video image. As described in the referenced application, each block is compressed by first subjecting it to a cosine transform, which generates a corresponding block of cosine transform coefficients. These coefficients are then rearranged from a block array to a serial succession of coefficients. Then, those coefficients whose amplitude falls below a preselected threshold value are discarded. The next step is to divide each coefficient by a normalization factor and then to quantize the resulting quotient by simply dropping the fractional portion of it. The quantized quotient is then minimum redundancy encoded to generate the compressed data. The compander processor organizes the compressed data in serial fashion and then transmits it over the narrow bandwidth channel (telephone line). Typically, the serially arranged compressed data is divided into a plurality of serial data segments, which are then transmitted one by one.

Problem To Be Solved

The problem now is what to do when one or more of the segments is lost during transmission, due to noise or other problems on the telephone line. The simplest procedure is to simply continue transmitting the remaining segments in the compressed image data and ignore the loss of the particular segment. Unfortunately, this may significantly degrade the quality of the received image. Another solution would be to interrupt transmission of the remaining segments while the lost segment is retransmitted. This requires that a copy of each compressed data segment be held by the transmitting compander processor in memory unless or until it is determined that the transmission of that segment to a receiver compander processor was successful. Of course, in the event transmission is interrupted to retransmit a lost segment, normal transmission of the remaining segments would resume as soon as it is determined that the retransmitted segment has been successfully received.

While this latter solution avoids losses in image quality due to noisy telephone lines, it creates other problems which must be solved. First, retransmitting a compressed data segment will either increase the overall transmission time due to the necessity of waiting at the end of each segment for an acknowledgment from the receiver, or require that the next segment be transmitted during this waiting period (to save time), forcing some segments to be transmitted or retransmitted out of order. The problem here is that retransmission of segments out of order may cause the transmitter or receiver to lose track of their proper location in the uncompressed video frame. Another problem is that, because a copy of each compressed data segment must be held in the transmitting transceiver, the task of managing compressed and uncompressed stored image data would appear to be complicated and perhaps not cost effective.

It is an object of the invention to provide a simple cost effective architecture which not only permits retransmission of lost compressed data segments but also permits transmission of successive data segments while waiting for the receipt acknowledgment of previous data segments (to save time) and permits transmission of data segments out of order without losing track of the relative location of these data segments in the uncompressed video frame.

SUMMARY OF THE INVENTION

Solution to the Problem

The invention is a transceiver processor comprising a data control processor associated with the compander processor and a segment information array. The segment information array tracks multiple events in real time in the manner of a scoreboard to enable the transceiver processor to transmit the next compressed data segment without waiting for receipt acknowledgment of the last data segment and to retransmit any lost data segments out of sequence, if necessary, without losing track of the relative video frame location of any one segment and the proper order of all segments.

In order to be responsive to a receipt acknowledgment from a receiving video transceiver after transmission of each data segment, the transceiver processor has two channels, a first channel for transmission of data and a second channel for receipt of an acknowledgment.

The data control processor responds to the contents of the segment information array while simultaneously updating the segment information array with the occurrence of each relevant event tracked by the array. In essence, the segment information array reflects in real time the progress of transmission of the compressed data segments representing the video frame stored in the frame store memory, including which uncompressed data blocks have been compressed into data segments, which data segments have been transmitted, and, of these, which ones have been receipt acknowledged and which ones correspond to a copy still held in memory pending a need for retransmission, and the origin of each compressed data segment in the uncompressed image.

The advantage is that, with a minimum of hardware, a video transceiver may compress one still frame of a full quality NTSC compatible video image, transmit the compressed image in about one minute or retransmit any data segments lost during a previous transmission without a significant increase in transmission time and without losing track of a segment's origin in the uncompressed image, with a simple and cost effective architecture.

DESCRIPTION OF THE DRAWINGS

The invention may be understood by reference to the accompanying drawings, of which:

FIG. 2 is a schematic block diagram of the video transceiver of the invention in the receive mode;

FIG. 3 is a block diagram illustrating the architecture of the segment information array employed in the video transceiver of the invention;

FIG. 4 is a diagram illustrating the sequence of events tracked by the segment information array;

FIG. 6 is a block diagram illustrating the receiving operation of the video transceiver of FIG. 2; and FIG. 7 is a block diagram illustrating the format of data transmitted by the video transceiver.

DETAILED DESCRIPTION OF THE INVENTION

System Overview

Figure 1:
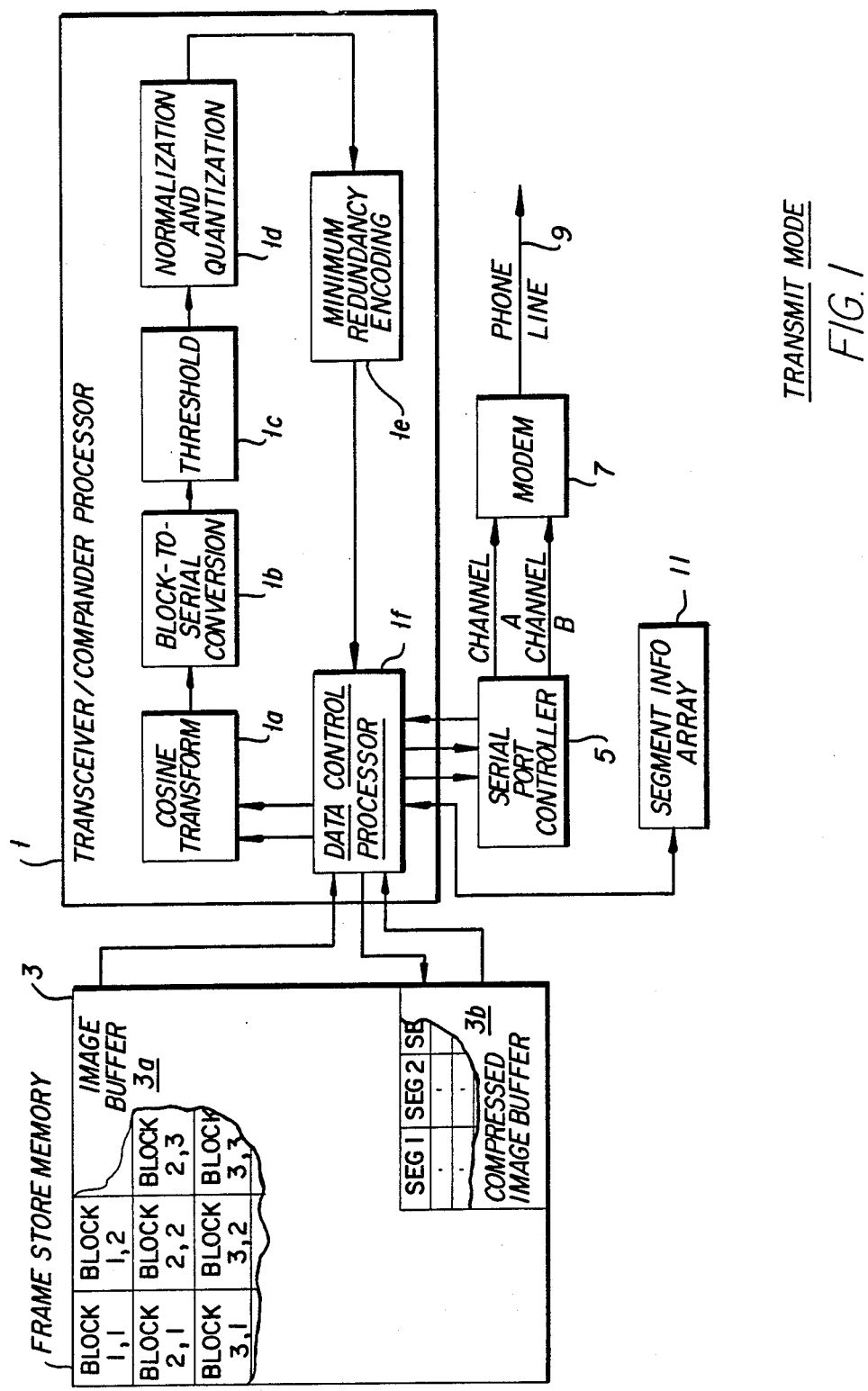
FIG. 1 is a schematic block diagram of the video transceiver of the invention in the transmit mode.

Referring to FIG. 1, a transceiver processor 1 receives data from an image buffer 3a of a still video frame store memory 3 containing data representing about 512 lines of a full quality NTSC color video image. The transceiver processor 1 compresses the data in preparation for transmission.

The video data stored in the image buffer 3a may be thought of as having been divided into square blocks, as though the blocks were drawn on a television monitor displaying the still video image corresponding to the image data stored in the buffer 3a. For example, block 1,1 is in the upper left hand corner of the image, as illustrated in FIG. 1. The transceiver processor grabs and processes each of these blocks from the image buffer 3a one block at a time.

The transceiver processor 1 includes a compander processor comprising a cosine transform processor $1a$ (which transforms each data block into a corresponding block of cosine transform coefficients), a block-to-serial conversion processor $1b$ (which converts each block of cosine transform coefficients to a serial array of coefficients, preferably in ascending order of spatial "frequency"), a threshold processor $1c$ (which discards coefficients below a certain threshold amplitude), a normalization-quantization processor $1d$ (which reduces the number of bits in each coefficient by reducing the bit resolution), and a minimum redundancy encoding processor $1e$ (which perform the remainder of the image compression tasks). The compressed data generated by the compander processor $1a$-$1e$ is arranged into continuous serial segments of compressed data and stored in a compressed image buffer $3b$ in the frame store memory 3 in the manner illustrated in FIG. 1.

DATA MANAGEMENT data control processor $1f$ grabs each block from the image buffer $3a$ and—during the compression process—organizes and stores the resulting compressed image data in serial data segments in the compressed image buffer $3b$. The data control processor $1f$ also manages a serial port controller 5 through which the compressed data segments stored in the compressed image buffer $3b$ may be transmitted through a modem 7 over a telephone line 9.

The skilled worker may choose to implement the various processors $1a$-$1f$ either as separate microprocessors or as a single microprocessor programmed to perform all of the functions of the processors $1a$-$1f$. Preferably, the functions of the processors $1a$-$1f$ are apportioned between a digital signal processor and a microprocessor.

As the compander processor $1a$-$1e$ begins compressing the video data (which was grabbed from the image buffer $3a$ block by block), and as the resulting compressed data segments begin filling the compressed image buffer $3b$, the data control processor $1f$ immediately begins feeding each data segment stored on the compressed image buffer $3b$, in order, to the serial port controller 5.

The serial port controller 5 transmits the compressed data segments over "channel A" of the modem 7 on the phone line 9. An identical video transceiver, operating in the "receive" mode (illustrated in FIG. 2) may receive at its modem 7' the compressed data at the other end of the phone line 9. Its data control processor $1f$ transmits over another channel of the modems 7, 7' ("channel B") an "acknowledgment" (if the last received data segment was error-free) or a "negative acknowledgment" (if an error was present in the last received data segment). The acknowledgment ("Ack") or negative acknowledgment ("Nack") is received on channel B of the modem 7 of the transmitting video transceiver (FIG. 1). In the meantime, the data control processor $1f$ (FIG. 1) has already grabbed the next-in-order data segment from the compressed image buffer $3b$ and hands it to the serial port controller 5 for transmission over the phone line 9. In some cases, one can think of the next data segment being transmitted from the over channel A while an acknowledgment or negative acknowledgment is being received simultaneously over channel B.

If a negative acknowledgment is received, then the previous data segment must be again fetched from the compressed image buffer 3b by the data control processor 1f and handed to the serial port controller 5 for retransmission over channel A (at the next opportunity). Such a retransmission interrupts the normal order of data segments.

SEGMENT INFORMATION ARRAY

The data control processor 1f responds to and updates the contents of a segment information array 11. The architecture of the segment information array 11 is illustrated in FIG. 3 and may be thought of as a scoreboard reflecting in real time the change in status of each compressed data segment and progress of transmission of the video image stored in the image buffer 3a. The segment information array 11 is a random access memory comprising an array of digital bits arranged by rows and columns, each row (arranged horizontally in FIG. 3) reflecting the status of a particular one of the data segments stored in the compressed image buffer 3b.

Each of the horizontal rows is divided by columns. Column 11a stores indices reflecting the order of the compressed data segments by row. Column 11b stores the address of the compressed data segment in the compressed image buffer 3b. Column 11c stores the address in the image buffer 3a of the original (uncompressed) video data from which the compressed data segment was derived. Column 11d stores a set of bits identifying the type or mode of the image (e.g., full vs. partial resolution image) and the data rate at which the modem 7 is to operate in transmitting the data segment. Column 11e stores the number of bytes in the compressed data segment. Column 11f stores the status (either "full" or "not full") of the data segment. Column 11g stores the state of the data segment. In the transmit mode (FIG. 1), the state is either "sent" or "not sent". In the receive mode (FIG. 2) the state is either ACK (acknowledged) or NACK (unacknowledged).

The data in each row of columns 11c and 11d comprises a code ID word which is appended at the beginning of each data segment just prior to transmission. This code ID word permits the receiving video transceiver (FIG. 2) to maintain the proper order of all received data segments (notwithstanding any out-of-sequence transmissions or retransmissions). FIG. 7 illustrates the configuration of a typical compressed data segment, including the image data and its appended code ID word.

The segment information array 11 permits the data control processor 1f to implement the sequence of events illustrated in FIG. 4. In this sequence, the frame store memory 3 supplies each compressed data segment in serial order and the serial port controller 5 transmits each segment via the modem 7 on channel A in the absence of a negative acknowledgment on channel B. For each negative acknowledgment, of course, the data control processor 1f—referring to the segment information array 11—causes the serial port controller 5 to retransmit (out of order) that segment corresponding to the just-received negative acknowledgment, and then to resume transmitting the remaining compressed data segments in their original order.

TRANSMISSION ALGORITHM

Figure 5:
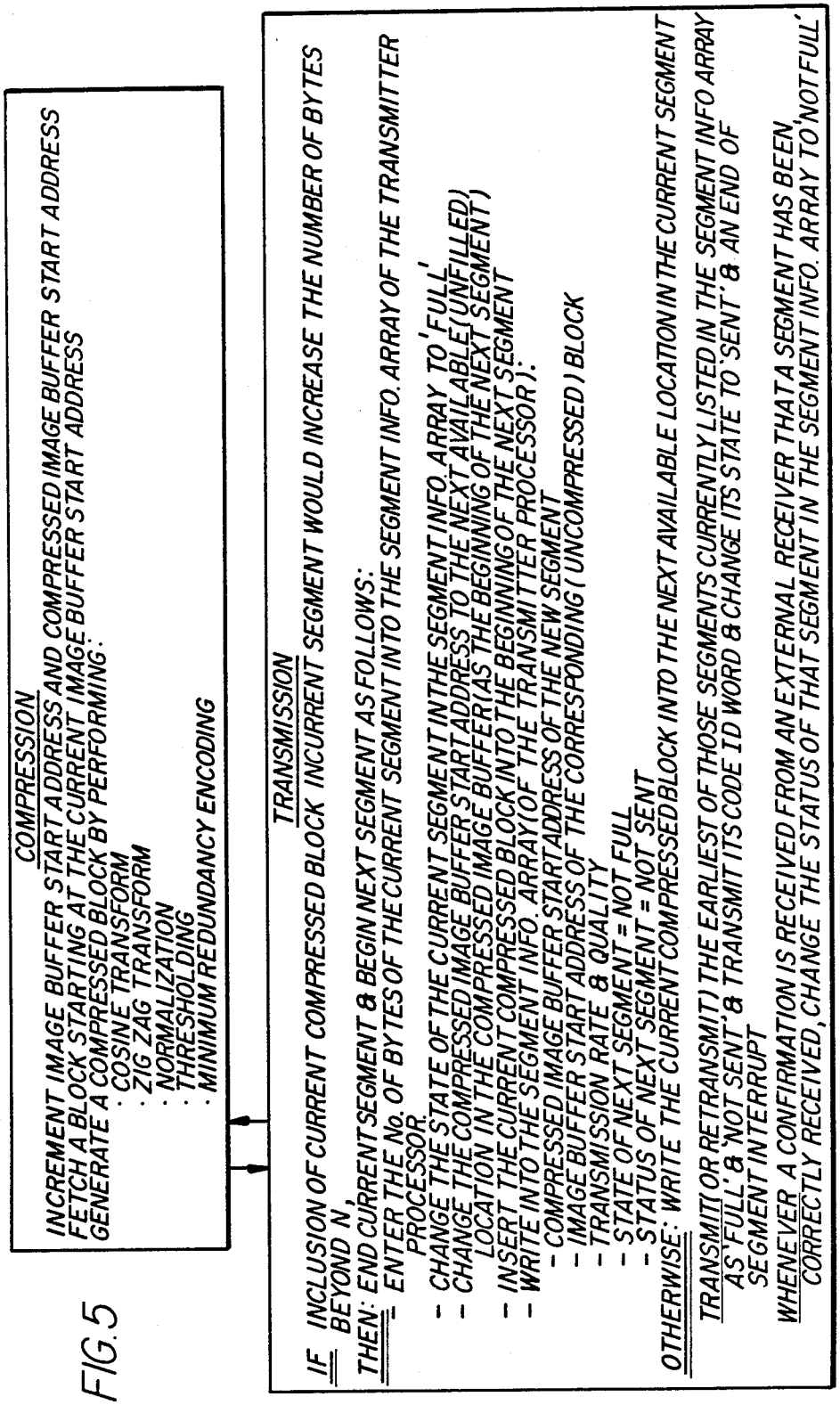
FIG. 5 is a block diagram illustrating the transmission operation of the video transceiver of FIG. 1.

FIG. 5 illustrates the transmission algorithm performed by the video transceiver of FIG. 1 operating in the transmit mode. The data control processor 1f stores two address pointers, namely an image buffer start address pointer and a compressed image buffer start address pointer. Each successive step of the algorithm of FIG. 5 begins with the data control processor 1f incrementing the image buffer start address pointer to the start address of the next block in the image buffer 3a to be processed, and incrementing the compressed image buffer start address to the next available location in the compressed image buffer 3b. The data control processor 1f then fetches the block which begins at the location of the image buffer start address pointer and furnishes this block to the cosine transform processor 1a.

The cosine transform processor generates a corresponding block of cosine transform coefficients which are then converted in the block-to-serial conversion processor 1b to a serial succession of cosine transform coefficients. The threshold processor 1c, the normalization and quantization processor 1d and the minimum redundancy encoding processor 1e complete the task of compressing the cosine transform coefficients in the manner described previously herein. The data control processor 1f then begins the transmission portion of the algorithm of FIG. 5.

The data control processor 1f first determines if insertion of the current batch of compressed data (i.e., that generated from the last block fetched from the image buffer 3a) into the segment currently being filled in the compressed image buffer 3b would increase the number of bytes in that segment beyond a preselected maximum number of bytes-per-segment, N. (The size of each batch is uniquely determined by the spatial frequency contents of the corresponding image block, and therefore varies from batch to batch.) If the maximum byte number N would be exceeded, then the current batch of compressed data is excluded from the segment currently being filled in the compressed image buffer 3b. Instead, the data control processor 1f terminates the filling process of the current segment in the compressed image buffer and begins filling the next segment with the current compressed data batch, as follows.

First, the data control processor 1f determines the number of bytes now stored in the current segment in the compressed image buffer 3b and enters that number into column 11e of the segment information array 11 in the row corresponding to the current segment. Then, the data control processor 1f changes to "full" the state stored in column 11g (in the same row). The data control processor 1f then changes the corresponding compressed image buffer start address pointer in column 11b to the address of the next available location in the compressed image buffer 3b, this next available location thereby being designated as the beginning of the next segment to be filled in the compressed image buffer 3b. Finally, the data control processor 1f causes the current compressed data (which was prevented from being inserted into the present segment) to be stored in the beginning of the next segment in the compressed image buffer 3b.

Thereafter, the data control processor 1f revises information in the segment information array 11 as follows: The current location of the compressed image buffer start address pointer of the new segment is written into column 11b in the next row (corresponding to the next compressed data segment); the original location address in the image buffer 3a of the uncompressed data block (corresponding to the compressed data batch just loaded into the new segment) is written into column 11c in the row corresponding to the next segment; the corresponding transmission rate is written into column 11d of the in the same row; the state of the next segment is changed in column 11g to "not full" and the status of the next segment is changed in column 11f to "not sent". This completes the IF and THEN branches of the transmission portion of the algorithm of FIG. 5.

The data control processor 1f now causes the serial port controller 5 to transmit the earliest of those segments currently listed in the segment information array as "full" and "not sent", and to transmit the corresponding code ID word as a header with the segment. At the same time, the data control processor 1f changes the state of the segment, stored in column 11g, to "sent". After the segment and its code ID word has been so transmitted, the serial port controller 5 then transmits an end of segment interrupt.

Whenever an acknowledgment is received through channel B that a data segment has been correctly received, the data control processor 1f changes the status of that segment in column 7f to "not full".

RECEIVE ALGORITHM

FIG. 6 illustrates the algorithm performed by the video transceiver of FIG. 2 operating in the receive mode. This algorithm is simply the reverse of the transmission algorithm of FIG. 5. Referring to FIGS. 2 and 6, the serial port controller 5' receives the code ID word of an incoming compressed data segment from the phone line 9 through the modem 7'. The data control processor 1f enters the information in the code ID word into its segment information array 11' and sets the compressed image buffer start address to the next available location in the compressed image buffer 3b'. It also makes the following changes in the segment information array 11': it enters the start address of the current segment in the compressed image buffer 3' into the corresponding row in the compressed image buffer address column (column 11b in FIG. 3), changes the state of the segment to "not full" and the status of the segment to "NACK" (negative acknowledgment). Simultaneously, the serial port controller 5' receives the incoming data segment while the data control processor 1f, causes this data to be loaded into the compressed image buffer 3b' beginning at the compressed image buffer start address. At the end of the compressed data segment, the serial port controller 5' receives an end of segment interrupt, and at this point the data control processor 1f responds to the interrupt by changing the state of the segment to "full" (reflecting the fact that the entire segment has now been received and loaded into the compressed image buffer 3b').

The data control processor 1f then performs an error detection task of the type well-known in the art using cyclic redundancy check (CRC) bits in the data segment, to determine whether any errors occurred during transmission. If an error is detected at this point, the "NACK" status remains unchanged and is transmitted from the serial port controller 5' via channel B to the modem 7' and over the phone line 9 to the transmitting video transceiver. In this case, the data segment just received in the compressed image 3b' is defective and should be discarded. Therefore, the data control processor 1f returns the compressed image buffer address pointer back to the compressed image buffer start address, so that the next compressed data segment to be received will be written over the current segment, thus erasing it from the compressed image buffer 3b'.

On the other hand, if no error is detected, then the current segment just received in the compressed image buffer 3b' is good, and the data control processor 1f changes its status in the segment information array 11' to "ACK" and causes the serial port controller 5' to transmit this status (as an acknowledgment) via channel B to the transmitting video transceiver. Then, the data control processor 1f determines, from the current location of the compressed image buffer address pointer, the number of bytes in the current segment and enters this number into the appropriate column of the segment information array 11'.

The expansion portion of the receive algorithm of FIG. 6 now begins. The data control processor 1f scans the segment information array 11' to determine the earliest of those segments for which the segment information array 11' indicates a "full" state and an "ACK" status, and fetches the corresponding segment from the compressed image buffer 3b' (using the corresponding compressed buffer address stored in the segment information array 11'). The data control processor 1f transmits this segment to the minimum redundancy decoder processor 1e', whose output is applied to the denormalization processor 1d' (which multiplies the decoded data by the same factor by which the normalization quantization processor 1d of FIG. 1 divided the corresponding data). The output from the denormalization processor 1d' is applied to a serial-to-block conversion processor 1b' which converts the serial stream of data to a block of data comprising a set of cosine transform coefficients (many of which are zero due to the compression process). More than one such block of a complete set of cosine transform coefficients may be generated from the current segment, depending upon the degree of compression which was previously achieved in the transmit mode by the transmitting video transceiver. Each such block is applied to the inverse cosine transform processor 1a' to generate a corresponding block of spatial amplitude data. For each block generated by the inverse cosine transform processor 1a', the data control processor 1f refers to the corresponding image buffer address (stored the segment information array 11') to determine where in the image buffer 3a' to store the corresponding block of spatial amplitude data. The "expanded" blocks generated from each compressed data segment are stored in successive block locations in the image buffer 3a', based on the corresponding image buffer start address stored in the segment information array 11'. After the last compressed data segment has been so processed, the image buffer 3a' is full, thus completing the algorithm of FIG. 6.

While the invention has been described in detail with reference to preferred embodiments thereof, it will be understood that variations and modifications thereof may be made within the spirit and scope of the invention.

What is claimed is:
1. A still video transceiver, comprising:
   a. still video frame store memory, said memory comprising:
      1. image buffer means for storing plural blocks of video data which together represent one frame of a video image;
      2. compressed buffer means for storing an ordered plurality of segments of compressed data, each of said segments being characterized by a state, a status and a length;

b. compander processor means for compressing a selected one of said blocks of video data and generating therefrom a batch of compressed video data includable in one of said segments;

c. a transceiver port comprising:
1. a first channel adaptable to transmit any one of said segments of compressed data to a destination;
2. a second channel adaptable to receive an acknowledgment signifying error-free receipt of said one segment at said destination and a negative acknowledgment signifying error-corrupted receipt thereof;

d. a data management processor, comprising:
1. segment information array means adaptable to store:
   a. the address of a next-in-order location in said compressed buffer means available to store said one segment;
   b. the address of the location in said image buffer means of said one selected block;
   c. the length of said one segment;
   d. the status of said one segment;
   e. the state of said one segment;
2. data control processor means for:
   a. initializing the state of said one segment to "not full";
   b. initializing the status of said one segment to "not sent";
   c. changing said state of said one segment to "full" and starting a new segment in said compressed buffer means whenever said compressed data batch cannot be included in said one segment without increasing its length beyond a predetermined limit;
   d. changing the status of said one segment to "sent" as soon as said one segment has been transmitted on said first channel;
   e. determining the earliest segment in said order of plural segments for which said state is "full" and said status is "not sent", fetching said earliest segment at the corresponding compressed image buffer address stored in said segment information array means, and transmitting said earliest segment on said first channel along with the corresponding image buffer address stored in said segment information array means;
   f. changing said status from "sent" to "not sent" whenever an acknowledgment or negative acknowledgment is received on said second channel, and changing said state from "full" to "not full" whenever said acknowledgment is received.

2. The still video transceiver of claim 1, wherein said compander processor comprises:
cosine transform means for producing from said one selected block a corresponding block of cosine transform coefficients;
block-to-serial conversion means for rearranging said block of cosine transform coefficients into a serial succession of such coefficients;
normalizing means for dividing each of said coefficients in said serial succession by a divisor to produce a quotient;
threshold processing means for discarding those of said quotients which do not exceed a predetermined threshold magnitude;
quantizing means for discarding a predetermined number of the least significant bits of each of said quotients; and
encoding means for minimum redundancy encoding each of said quotients to produce said batch of compressed video data.

3. The still video transceiver of claim 1, wherein said data control processor means computes and stores the length of each segment in said segment information array, and determines therefrom whether inclusion of a given batch of compressed data in the current segment would increase the length of said segment beyond said predetermined limit.

4. The still video transceiver of claim 1, wherein whenever said data control processor changes said status of said one segment to "not full" in response to said acknowledgment being received on said second channel, a corresponding space in said compressed buffer means previously storing said one segment is made available to store another segment.

5. The still video transceiver of claim 1, wherein said data control processor means determines from the status stored in said segment information array whether a receipt acknowledgment has been received for one of said segments previously transmitted, and retransmits any segments transmitted earlier for which a receipt acknowledgment has not been received.

6. A still video transceiver, comprising:
a. a still video frame store memory, said memory comprising:
1. image buffer means for storing plural blocks of video which together represent one frame of a video image;
2. compressed buffer means for storing an ordered plurality of segments of compressed data, each of said segments being characterized by a state, a status and a length;

b. compander processor means for expanding a selected one of said segments and generating therefrom at least one of said blocks of video data;

c. a transceiver port, comprising:
1. a first channel adaptable to receive any one of said segments of compressed data from an origin;
2. a second channel adaptable to transmit a receipt acknowledgment signifying receipt of said one segment from said origin;

d. a data management processor comprising:
1. segment information array means adaptable for storing:
   a. the address of a next-in-order location in said compressed buffer means available to store said one segment;
   b. the address of the location in said image buffer means of said one selected block;
   c. the length of said one segment;
   d. the status of said one segment;
   e. the state of said one segment;
2. data control processor means for:
   a. initializing the state of said one segment to "not full";
   b. initializing the status of said one segment to "negative acknowledge";
   c. changing the state of a corresponding segment to "full" whenever the entirety of that segment has been received with its corresponding image buffer address on said first channel and storing said one segment at the corresponding compressed buffer address stored in said segment information array and storing said corresponding image buffer address in said segment information array;

d. changing said status to "acknowledged" whenever said entire one segment is error free and transmitting a corresponding receipt acknowledgment on said second channel;

e. determining the earliest segment in said ordered plurality of segments for which said state is "full" and said status is "acknowledged", fetching it at the corresponding compressed buffer address stored in said segment information array, and transmitting it to said compander processor for expansion to generate at least a corresponding one of said blocks of video data, and storing said corresponding video block at the corresponding image buffer address stored in said segment information array.

7. The video transceiver of claim 6 wherein said compander processor comprises:

decoding means for minimum redundancy decoding said one segment to generate a serial succession of minimum redundancy expanded cosine transform coefficients;

denormalization means for multiplying said succession of cosine transform coefficients by a factor to produce a succession of denormalized cosine transform coefficients;

serial-to-block conversion means for rearranging said denormalized cosine transform coefficient from said serial succession to at least one block of denormalized cosine transform coefficients; and inverse cosine transform means for producing from said block of denormalized cosine transform coefficients one of said blocks of video data.

8. The still video transceiver of claim 6 wherein said data control processor means determines whether any errors are present in said one segment, and causes a receipt acknowledgment to be transmitted over said second channel to said origin in the absence of such errors.

9. The still video transceiver of claim 6 wherein said data control processor means causes each video data block corresponding to said one segment to be stored at a location determined by the corresponding image buffer address stored in said segment information array without regard to the order of receipt of the corresponding segment.

* * * * *